(12) United States Patent
Lane et al.

(10) Patent No.: US 8,002,865 B2
(45) Date of Patent: *Aug. 23, 2011

(54) SEPARATOR ASSEMBLY

(75) Inventors: Brian Lane, Tyne & Wear (GB);
Stephen Bittle, Northumberland (GB);
Ray Trowsdale, County Durham (GB)

(73) Assignee: Parker Hannifin Limited, Parker House, Hemel Hempstead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,192

(22) Filed: Jun. 25, 2010

(65) Prior Publication Data
US 2010/0257827 A1    Oct. 14, 2010

Related U.S. Application Data

(63) Continuation of application No. 11/972,738, filed on Jan. 11, 2008, now Pat. No. 7,766,989.

(51) Int. Cl.
*B01D 45/00* (2006.01)
(52) U.S. Cl. .............. 55/426; 55/424; 55/457; 55/435; 55/462; 55/464; 55/502; 55/DIG. 17; 55/429; 55/DIG. 46
(58) Field of Classification Search .............. 55/426, 55/435, 462, 464, 502, 424, 457, DIG. 17, 55/DIG. 46
See application file for complete search history.

(56) References Cited

U.S. PATENT DOCUMENTS

| | | | |
|---|---|---|---|
| 1,906,432 A | 5/1933 | Summers |
| 2,801,751 A | 8/1957 | Thomas |
| 3,590,558 A | 7/1971 | Fernandes |
| 3,802,570 A | 4/1974 | Dehne |
| 4,516,994 A | 5/1985 | Kocher |
| 4,838,434 A | 6/1989 | Miller |
| 5,391,294 A | 2/1995 | Mercier et al. |
| 6,251,296 B1 | 6/2001 | Conrad |
| 6,416,563 B1 | 7/2002 | Wright et al. |

FOREIGN PATENT DOCUMENTS

| | | |
|---|---|---|
| DE | 103 19 134 A1 | 6/2004 |
| FR | 2 205 369 A | 5/1974 |
| GB | 2 110 562 A | 6/1983 |

(Continued)

OTHER PUBLICATIONS

United Kingdom Search Report dated Oct. 26, 2005 filed in related U.S. Appl. No. 11/972,915, entitled Separator Assembly.

(Continued)

*Primary Examiner* — Jason M Greene
*Assistant Examiner* — Dung H Bui
(74) *Attorney, Agent, or Firm* — Christopher H. Hunter

(57) ABSTRACT

A separator assembly for removing material that is entrained in a gas stream. The separator assembly comprises a housing having a head part which provides the upper end of the housing and a body part which provides the lower end of the housing. The separator assembly also comprises a shield which extends across the housing towards the lower end thereof so as to leave a collection space between it and the lower end in which material that is separated from the gas stream can collect. There is at least one opening in or around the shield through which the material can flow past the shield into the collection space. The separator assembly further comprises a liner sleeve which covers at least a part of the inside wall of the body part between the shield and the upper end of the body part.

6 Claims, 7 Drawing Sheets

FOREIGN PATENT DOCUMENTS

| | | |
|---|---|---|
| GB | 2 177 951 A | 2/1987 |
| JP | 07332302 A | 12/1995 |
| SU | 1721296 A1 | 3/1992 |
| WO | 03/030702 A2 | 4/2003 |
| WO | 03/033106 A1 | 4/2003 |
| WO | 2005/023396 A1 | 3/2005 |
| WO | 2006/013331 A1 | 2/2006 |
| WO | 2006/013333 A1 | 2/2006 |

OTHER PUBLICATIONS

Notification of Transmittal of The International Search Report and the Written Opinion of The International Searching Authority or the Declaration dated Apr. 9, 2006 in related International Application No. PCT/GB2006/002737 and filed in related U.S. Appl. No. 11/972,915, entitled Separator Assembly.

The Office Action of the U.S. Patent Office mailed Sep. 1, 2009 and Amendment filed in response thereto on Feb. 15, 2010 in related U.S. Appl. No. 11/972,915, entitled Separator Assembly.

Related U.S. Appl. No. 11/972,915, filed Jan. 11, 2008, entitled: Separatory Assembly.

Corresponding Search Report from the United Kingdom Patent Office dated Oct. 27, 2005.

Corresponding International Search Report in International Application No. PCT/GB2006/002727 dated Feb. 6, 2007.

Corresponding Notification of the International Preliminary Report on Patentability in International Application No. PCT/GB2006/002727 dated Nov. 15. 2007.

SEPARATOR ASSEMBLY

CROSS REFERENCE TO RELATED APPLICATIONS

This application is continuation of U.S. patent application Ser. No. 11/972,738 filed Jan. 11, 2008, which is a continuation of copending International Application No. PCT/GB06/002727 filed Jul. 21, 2006, which designated the United States, the disclosures of which are incorporated herein by reference, and which claims priority to Great Britain Patent Application Nos. 0524181.5 filed Nov. 28, 2005; and 0515266.5, filed. Jul. 26, 2005.

BACKGROUND OF THE INVENTION

The present invention relates to a separator assembly for removing material that is entrained in a gas stream such as liquid in an aerosol form.

SUMMARY OF THE INVENTION

Removal of material from a gas stream can be required to ensure that the gas is sufficiently clean for a subsequent application, or to minimise adverse effects of impurities on components of the system. For example, removal of compressor oil can be required to minimise chemical contamination and accumulation on valves which might lead to malfunction of the valves, and removal of particulate solid material can be required to minimise abrasion. Also, removal of liquid such as water droplets from a gas stream can be required in order to minimise contaminant loading in downstream filters.

There are many known separator assemblies for use in a compressed gas systems which are designed to remove material from a gas stream prior to a downstream application. Such separator assemblies include water separators which utilise centrifugal forces caused by a helically flowing gas stream to separate bulk liquid, such as water, from the gas stream. Such water separators assemblies generally comprise a housing having inlet and outlet ports at an upper end of the housing for the gas stream that is to be filtered, a plurality of baffles arranged to impart a helical flow to gas entering the housing, and a shield located between the inlet and outlet ports and an reservoir area at the lower end of the housing at which separated material collects. A liquid drainage port can be provided at the lower end of the housing through which liquid can be removed from the housing. The shield is typically a flat plate and is suspended within the housing by a tie rod extending from the top end of the housing. A gas stream enters the housing through the inlet port. Liquid separated from the gas stream falls to the bottom of the housing where it gathers at the lower end of the housing. The shield acts to quell the turbulent air flow so as to create a "quiet space" between itself and the lower end. This quiet space helps to minimise the amount of liquid becoming re-entrained in the gas stream. Also, when a drainage port is present, the quiet space can allow the drainage port to function properly.

It can be important to minimise the pressure drop across a separator assembly. Typically, the higher the pressure drop across a separator assembly in a compressed gas system, the lower the efficiency of the system and the higher the operating costs of the system.

It can also be important to minimise the re-entrainment of material that has been removed from the gas stream.

According to a first aspect of the invention, there is provided a separator assembly for removing material that is entrained in a gas stream comprising: a housing having a head part which provides the upper end of the housing and a body part which provides the lower end of the housing; and a shield which extends across the housing towards the lower end thereof so as to leave a collection space between it and the lower end in which material that is separated from the gas stream can collect, with at least one opening in or around the shield through which the material can flow past the shield into the collection space, a liner sleeve which covers at least a part of the inside wall of the body part between the shield and the upper end of the body part.

It is an advantage of the present invention that the use of a liner sleeve can improve the efficiency of a separator assembly. For example, the use of a liner sleeve can reduce the re-entrainment of material separated from the gas stream, back into the gas stream. This is because the inside wall of the body part is made from materials which provide the necessary strength required to withstand internal pressures resulting from the flow of gas through the assembly. The properties of the material from which the wall of the body part is made are such that the material removed from the gas stream can tend to cling to the inside wall, rather than falling down the inside wall past the shield to the quiet space, and so gives rise to the possibility of the material becoming re-entrained in the gas stream. The liner sleeve does not need to have the strength and rigidity of the body part. Accordingly, the liner sleeve can be made from materials having properties which reduce the tendency of the material to cling to the liner sleeve, thereby reducing the chance of the material becoming re-entrained in the gas stream. Also, many different types of liner sleeve can be made having different properties. Accordingly, a liner sleeve can be selected for a separator apparatus depending on the application in which the separator assembly is to be used, so that the properties of the liner sleeve are most suited to that application.

Preferably, the liner sleeve extends completely annularly around the inside wall of the body part. Accordingly, the liner sleeve can in the form of a tubular structure with a closed-loop cross-section. Optionally, the liner sleeve can be made from a sheet of material that can be wrapped around to form a tubular structure having an overlapping cross-section.

Preferably, the outer side of the liner sleeve is shaped and sized so that it is a snug fit within the housing body part.

Preferably, the liner sleeve extends from the face of the shield which is directed toward the upper end of the housing to a point proximal the upper end of the body part. Preferably, the liner sleeve extends along the length of the body part for at least 50% of the distance between the face of the shield which is directed toward the upper end of the housing and the upper end of the body part, more preferably at least 75%. Most preferably, the liner sleeve extends from the face of the shield which is directed toward the upper end of the housing to the upper end of the body part.

Preferably, the liner sleeve is located in the body part of the housing so that it can be removed from the body part. This is advantageous as it provides for the removal, cleaning, maintenance and interchanging of the liner sleeve.

Preferably, the liner sleeve is approximately round, especially approximately circular, in shape when viewed from above. This can help to minimise disturbance of the flow of gas due to discontinuities in the path defined by the liner sleeve. It has been found that a circular liner sleeve can help to maintain the helical flow of gas, thereby maintaining the separating property of helical flow of gas caused by centrifugal force. Further, a circular shaped liner sleeve can provide less resistance to a helical gas stream flowing within it. As a result, it has been found that the pressure drop experienced across the separator assembly is less with a circular liner sleeve.

It can be preferable that the surface of the inner side wall of the liner sleeve, that is the side of the liner sleeve that does not face the internal side wall of the housing has formations which reduces the tendency of liquid to cling to the surface of the inner side wall of the liner sleeve. For example, it can be preferable that the surface of the inner side wall of the liner sleeve, is roughened. This is because liquid will tend to cling to a smooth surface due to surface tension, and therefore not readily fall down the surface of the liner sleeve, past the shield into the quiet space. This can cause problems with the liquid becoming re-entrained within the gas stream. Preferably, the texture of the surface of the inner side of the liner sleeve is rough. Roughened surfaces have been found to reduce the tendency of liquid to collect due to surface tension effects.

It can also be preferable that the surface of the inner side wall of the liner sleeve has at least one groove formed in it. Again, the use of grooves has been found to aid drainage of the material from the surface of the inner side wall of the liner sleeve. The at least one groove can extend substantially parallel to the axis of the body part when in use. Optionally, the at least one groove extends helically around the surface of the inner side wall of the liner sleeve. Accordingly, the at least one groove can extend at an angle to the axis of the body part when in use. Preferably, the at least one groove extends along at least 50% of the length of the liner sleeve, more preferably at least 75% of the length of the liner sleeve, especially preferably at least 90% of the length of the liner sleeve. When there is more than one groove, preferably the grooves are spaced equally around the liner sleeve. When the groove extends substantially parallel to the axis of the body part when in use, preferably, the groove extends vertically.

It can be preferable to provide a liner sleeve having formations which reduce the tendency of liquid to cling to the surface of the inner side wall of the liner sleeve, such as a rough inner side surface, rather than providing a housing body having such formations because the housing body will typically be made from materials in which it can be difficult to form such formations. In contrast, the liner sleeve can be made from different materials in which it can be easier to form such formations. For example, the housing body will typically be made from metallic materials, whereas the liner sleeve will typically be made from polymeric materials. The grooves can be created as a result of moulding with an appropriately shaped mould. The rough texture can be created as a result of moulding with an appropriately roughened surface. Optionally, the rough texture can be created as a result of a physical abrading process. For example, the rough texture can be created as a result of colliding the surface of the inner side wall of the liner sleeve with hard particles, or by rubbing it against a harder roughened surface, such as a surface coated with abrasive particles. When the liner sleeve is made from metal, rough surfaces can be made by spark erosion or similar techniques.

It can be preferable that the surface of the inner side wall of the liner sleeve has a helically extending rifle formation. This can be advantageous because it can help to maintain the helical flow of gas as it flows through the assembly. Preferably, the rifle formation is provided by at least one ridge which is provided on the surface of the inner side wall of the liner sleeve. Optionally, the rifle formation can be provided by at least one groove which is provided on the surface of the inner side wall of the liner sleeve.

Features of the separator assembly in which the shield is located within the body part of the housing through engagement between at least one of (a) the edge of the shield and the internal side wall of the housing, and (b) the shield and the base of the housing, can be considered for incorporation in the separator assembly which includes a liner sleeve.

Preferably, the cross-sectional size of the shield taken perpendicularly to a shield axis that extends through and perpendicular to the centre point of the shield, changes along the length of shield axis. Preferably, the liner sleeve has a constant cross-section along its entire length.

It can be preferable to provide the liner sleeve as a separate piece to the shield because it can allow the interchanging of different liner sleeve having different properties, or removal of the shield wall for maintenance and/or cleaning, without the need to remove the shield from the housing.

The liner sleeve can be provided as a wall of the shield that extends around its perimeter on its face which is directed toward the upper end of the housing. Accordingly, the liner sleeve and the shield can be removed from the housing as one piece. When the liner sleeve is provided as a wall of the shield, preferably, the wall extends around the entire perimeter of the shield. The shield and the shield wall can be provided as a single moulded piece. Optionally, the shield and the shield wall can be formed as separate pieces that have been fastened together.

The shield can be located within the body part of the housing against forces in a direction towards the lower end of the housing as a result of the action against it by the gas stream through engagement between the shield, and/or when provided the shield wall and the internal side wall of the housing.

The shield can be located within the body part of the housing through engagement between a plurality of ribs extending from the shield or the side wall of the housing body. The shield can be located within the body part of the housing through engagement between a plurality of ribs provided on one of the shield or the side wall of the housing body, and corresponding grooves into which the ribs can be received on the other.

The shield can be located within the body part of the housing through engagement between a plurality of ribs that extend away from its perimeter toward the internal side wall of the housing and the side wall of the housing. The shield and ribs can be one piece. For example, the shield and ribs can be provided as a single moulded piece. Optionally, the shield and ribs can be separate pieces that can be fastened together.

Preferably, there are provided at least three ribs, more preferably at least four ribs, especially preferably at least five ribs, for example six ribs. Preferably, the ribs are arranged so that they are equally spaced around the perimeter of the shield. When a shield wall is provided, the ribs can be provided on the shield wall. The ribs can vary in shape and size. This can be advantageous if it is important to locate the shield in a particular orientation within the housing. In this case, the ribs can be shaped and sized so that the shield properly fits within the housing in only one orientation. The ribs can be located at any point along the length of the shield wall. For example, the ribs can be located at the end of the shield wall proximal the shield. Preferably, the ribs are located at the end of the shield wall distal to the shield.

The internal side wall can comprise a plurality of grooves into which the ribs can be slidingly received so as to locate the shield within the body part. Optionally, the width of the interior of the housing can decrease towards its lower end so that the shield is located within the body part by way of a wedge fit between the ribs and the internal side wall.

The shield can be located within the body part of the housing through engagement of the shield with at least one support member provided by the body part of the housing. For example, the shield can be located within the body part of the housing through engagement of the shield with at least one ledge extending at least partially around the internal side wall. For example, the shield could be located within the body part by the contact between the face of the shield that faces toward the base of the housing and a ledge on the internal side wall. There can be provided a plurality of ledges spaced around the internal side wall. There can be provided one ledge that extends annularly around the internal side wall.

Optionally, the at least one support member can be at least one upstand support that extends between the base of the housing and the face of the shield that faces toward the lower end of the housing. Preferably, there are provided a plurality of upstand supports. When there are a plurality of upstand supports, preferably they are located so that their top surfaces which the shield engages, are spaced around the face of the shield that faces toward the lower end of the housing, towards the perimeter of that face of the shield. Preferably the plurality of upstand supports are located so that their top surfaces are spaced equally around that face.

Preferably, the face of the shield that faces toward the lower end of the housing provides at least one socket into which the at least one support member can be received. This can be advantageous because the socket can have side walls which the top end of the support member that is received in the socket can engage to prevent rotation of the shield within the housing. Accordingly, the provision of a socket can reduce the amount the shield can spin within the housing.

In some circumstances it can be preferred that the socket and the support member are shaped and dimensioned so that the top end of the support member is a tight fit in the socket. This is so that the once the shield has been located in the body part so that the support member is received in the socket, the shield cannot rotate at all within the housing. The tight fit can also help to anchor the shield to the support member.

It can be preferable for the shield and the at least one support member to be configured so that the shield can be fixed to the support member by an element in addition to the shield and the at least one support member. For example, preferably the shield can be screwed to the support member by a screw that extends through the shield and into the upstand support. For example, the shield and/or the support member can have holes pre-drilled in them at the locations where the shield and the support member engage each other so as to easily allow a screw to be screwed into them to anchor the shield to the support member. This can be advantageous as it can help to ensure that the shield does not lift from the support member during use.

The engagement between the shield and the housing can be direct engagement. For example, the engagement can be provided by a surface or part of the shield contacting a surface or part of the internal side wall of base of the housing. Optionally, the engagement between the shield and the housing can be indirect. For example, a support can be provided that extends between, and engages both, the housing and the shield. In particular, an upstand support can be provided that extends between the base of the housing and the face of the shield that faces toward the lower end of the housing.

The opening can be a gap between the shield and the housing. The gap can exist as a result of a difference in at least one of the shape and size of the shield and housing. The gap can extend only part way around the shield. The gap can extend annularly around the shield. When the shield is be located within the body part of the housing through engagement between a plurality of ribs that extend away from its perimeter toward the internal side wall of the housing and the side wall of the housing, then the openings can be defined by the gap between the shield, ribs and the internal side wall.

When the shape and size of the shield and the housing are such that the shield is a snug fit within the housing so that there is little or no gap between the perimeter of the shield and the housing side wall, then preferably the opening is provided in the shield. When the opening is in the shield, preferably the opening is located toward the perimeter of the shield. The shape of the opening can be any regular or irregular shape. For example, the opening can be circular or square in shape. Preferably, the shape of the opening follows the shape of the perimeter of the shield. For example, is the shape of the perimeter of the shield is curved, preferably the shape of the opening is curved. Preferably the opening is located toward the perimeter of the shield. The closer the opening is toward the perimeter of the shield, the less disturbance caused to the helical flow by the opening. Preferably, the ratio of (a) the distance from the perimeter of the shield to its centre point, to (b) the distance of the perimeter of the shield to edge of the opening at its point closest to the centre of the shield (both distances being measured along the surface of the shield) is not less than about 2, more preferably not less than about 4, especially preferably not less than about 8.

When a shield wall is provided, then preferably the opening is provided in the shield. Preferably, the opening is provided towards its perimeter where the shield wall meets the shield.

Preferably the separator assembly further comprises a first flow director located between the inlet port and the shield, wherein the flow director is configured to impart a helical flow to the incoming gas stream. This can be advantageous as the separator assembly can be used to separate material entrained in a gas stream as a result of centrifugal forces arising from the helical flow.

A generally helical path is any path which extends around an axis so that material entrained in a gas is forced outward away from the axis, toward the wall of the housing, as a result of centrifugal forces. It is not necessarily that the helical path is a perfect helix. For example, the distance between the helical path of the gas stream and the wall of the housing could increase or decrease as the gas stream flows around the housing axis. For example, the helix spiral shaped so that the helical path tightens towards its leading or trailing end. Further, the angle of the gas stream to a plane perpendicular to the axis about which it flows could increase or decrease along the axis.

Preferably, the separator assembly includes an outlet tube which extends from the inside of the housing to the outlet port, through which gas flows between the inside of the housing and the outlet port. The provision of an outlet tube can isolate the flow of gas which is travelling toward the outlet port and away from the shield, from the flow of gas which is travelling away from the inlet port and toward the shield. This is advantageous as it can prevent the gas flowing away from the shield interfering with the gas flowing toward the shield. This can be particularly important when the separator assembly comprises a flow director located between the inlet port and the shield, wherein the flow director is configured to impart a helical flow to the incoming gas stream. This is because separating the flow of gas toward and away from the shield can minimise disturbances to the helical flow of the gas. As a result, the helical flow of gas in maintained, thereby maintaining the separating property caused by the helical flow of the gas, and also thereby minimising the pressure drop across the separator assembly.

Preferably the outlet tube is formed from a polymeric material. Preferred polymeric materials include polyolefins (especially polyethylene and polypropylene), polyesters, polyamides, polycarbonates and the like. Polymeric materials used for the outlet tube can be reinforced, for example by fibrous materials (especially glass fibres or carbon fibres). Materials other than polymeric materials can be used, for example metals.

Preferably the outlet tube is formed by moulding, for example, by injection moulding.

Preferably, the outlet tube is located within the housing against forces as a result of the action against it by the gas stream through engagement between inter-engaging formations provided on the outlet tube and the housing body. The inter-engaging formations can be in the form ribs provided on one of the outlet tube and the housing body, and grooves provided on the other. Preferably, the ribs are provided on the outlet tube.

When a shield wall is provided, it can be preferred that the outlet tube is located within the housing against forces as a result of the action against it by the gas stream through engagement between inter-engaging formations provided on the outlet tube and the shield wall. The inter-engaging formations can be in the form ribs provided on one of the outlet tube and the shield wall, and corresponding grooves into which the ribs can be slidingly received provided on the other. Preferably, the ribs are provided on the outlet tube.

The cross-sectional shape of the outlet tube taken perpendicular to its longitudinal axis can be any regular or irregular shape. Preferably, the cross-sectional shape of the outlet tube is generally rounded. Preferably, the cross-sectional shape of the outlet tube is constant along its length. The size of the cross-sectional shape of the outlet tube need not necessarily be constant along its length. For example, when the cross-sectional shape of the outlet tube is generally rounded, the diameter of the outlet tube can vary along its length.

Preferably, the first flow director is fastened to the outlet tube. The flow director and the outlet tube can be provided as a single piece. For example, the flow director and the outlet tube can be created from a single mould. This can enable easy manufacturing and putting together of the assembly. The flow director and the outlet tube can be provided as separate pieces, which can be fastened together. This can allow different flow directors to be used with different outlet tubes.

When there is provided a flow director, preferably the outlet tube and flow director are located within the housing against forces as a result of the action against them by the gas stream through engagement between inter-engaging formations provided on the flow director and the housing body. The inter-engaging formations can be in the form of ribs provided on one of the flow director and the housing body, and grooves provided on the other. Preferably, the ribs are provided on the flow director.

When a shield wall is provided, it can be preferred that the outlet tube and flow director are located within the housing against forces as a result of the action against it by the gas stream through engagement between inter-engaging formations provided on the flow director and the shield wall. The inter-engaging formations can be in the form of ribs provided on one of the flow director and the shield wall, and corresponding grooves into which the ribs can be slidingly received provided on the other. Preferably, the ribs are provided on the flow director. When the flow director comprises a plurality of vanes (as described in more detail below), preferably at least one of the ribs is a vane.

If the outlet tube is formed separately from the flow director, then preferably the flow director and the outlet tube are formed form the same material. Preferably, the flow director outlet tube can be fastened to the outlet tube so that it can be subsequently removed. For example, preferably the flow director is fastened to the outlet through the use of a mechanical fastening such as a latch, co-operating screw threads, or engaging bayonet formations. More preferably, the outlet tube and the flow director are shaped and sized so that the outlet tube is held within the flow director by the friction forces between the outlet tube and the flow director.

It can be advantageous in some applications to fasten the flow director to the outlet tube so that the flow director cannot be subsequently removed from the outlet tube. In this case, preferably the flow director is fastened to the outlet tube without the use of a material which is different from the materials of the flow director and outlet tube. For example, preferably, the flow director is fastened to the outlet tube through the use of a welding technique, for example, ultrasonic or heat welding. However, it will be appreciated that the flow director can be fastened to the outlet tube through the use of a third party material such a bonding agent, for example an adhesive.

Preferably, an axis extending through the centre of the outlet tube and parallel to the outlet tube at its inlet end, and an axis extending through and perpendicular to the centre point of the face of the shield which is directed towards the upper end of the housing, are coaxial. This can help to ensure that gas travelling away from the shield enters the outlet tube. When the face of the shield which is directed towards the upper end of the housing, preferably the inlet end of the outlet tube faces toward the bowl-shaped face of the shield.

The faces of the shield can be planar. Preferably, the face of the shield which is directed towards the upper end of the housing is bowl-shaped. This is particularly advantageous when the separator assembly comprises a flow director located between the inlet port and the shield, wherein the flow director is configured to impart a helical flow to the incoming gas stream. This is because the bowl-shaped face of the shield can help to accelerate the helical flow of gas and to direct it back toward the outlet port. By maintaining the helical flow of gas, accelerating it, and directing it back toward the outlet port in a uniform manner, it has been found that the pressure drop across a separator assembly according to the present invention can be less than that across current separator assemblies. Details of a separator assembly in which the face of the shield which is directed towards the upper end of the housing is bowl-shaped are disclosed in the application entitled Separator Assembly which is filed with the present application bearing agent's reference P211193WO and claiming priority from UK Patent Application numbers 0515264.0 and 0524173.2. Subject matter that is disclosed in that application is incorporated in the specification of the present application by this reference.

Preferably, the flow director comprises a plurality of vanes which are arranged around the axis of the housing and inclined to that axis so that incoming gas is made to follow a generally helical path within the housing, in which the vanes are arranged in an array around the outlet tube. It has been found that the position of the shield relative to the outlet port and the vanes can affect the efficiency of the assembly. If the shield is located too far away from the outlet port then a significant proportion of gas travelling away from the shield can miss the outlet tube. If the shield is located too close to the outlet port then the advantages of accelerating the cyclone, when the face of the shield which is directed towards the upper end of the housing is bowl-shaped, can be reduced. Preferably, when the face of the shield which is directed towards the upper end of the housing is bowl-shaped, the ratio of the distance between the vanes and the bottom of the shield to the distance between the end of the outlet tube which faces the shield and the bottom of the shield is at least about 1, more preferably at least about 1.2, especially preferably at least about 1.5, for example at least about 1.7. Preferably, the ratio of the distance between the vanes and the bottom of the shield to the distance between the end of the outlet tube which faces the shield and the bottom of the shield is not more than about 2.5, more preferably not more than about 2.2, especially preferably not more than about 2, for example not more than 1.8.

Preferably, the assembly also includes a second flow deflector so that gas flowing into the housing flows over the second flow deflector so that the incoming gas is forced toward the side walls of the housing. Preferably, the second flow deflector is located downstream of the first flow director, so that the gas stream flowing into the housing flows over the first flow director first, and then flows over the flow deflector. Accordingly, preferably, the second flow deflector is located on the side of the flow director that is distal to the inlet port.

Preferably, the second flow deflector extends annularly around the outlet tube. Preferably, the second flow deflector comprises a ledge portion proximal the flow director which extends away from the outlet tube, substantially perpendicularly to the axis of the housing. Preferably, the flow conduit further comprises an side skirt which extends away from the free end of the ledge portion, in a direction substantially parallel to the axis of the housing.

Preferably, the second flow deflector is fastened to the outlet tube. The flow deflector and the outlet tube can be provided as a single piece. For example, the flow deflector and the outlet tube can be created from a single mould. This can enable easy manufacturing and putting together of the assembly. The second flow deflector and the outlet tube can be provided as separate pieces, which can be fastened together. This can allow different flow deflector to be used with different outlet tubes.

If the outlet tube is formed separately from the second flow deflector, then preferably the second flow deflector and the outlet tube are formed form the same material. Preferably, the flow deflector outlet tube can be fastened to the outlet tube so that it can be subsequently removed. For example, preferably the second flow deflector is fastened to the outlet through the use of a mechanical fastening such as a latch, co-operating screw threads, or engaging bayonet formations. More preferably, the outlet tube and the second flow deflector are shaped and sized so that the outlet tube is held within the flow deflector by the friction forces between the outlet tube and the flow deflector.

It can be advantageous in some applications to fasten the second flow deflector to the outlet tube so that the flow deflector cannot be subsequently removed from the outlet tube. In this case, preferably the second flow deflector is fastened to the outlet tube without the use of a material which is different from the materials of the flow director and outlet tube. For example, preferably, the second flow deflector is fastened to the outlet tube through the use of a welding technique, for example, ultrasonic or heat welding. However, it will be appreciated that the second flow deflector can be fastened to the outlet tube through the use of a third party material such a bonding agent, for example an adhesive.

Preferably the second flow deflector is formed from a polymeric material. Preferred polymeric materials include polyolefins (especially polyethylene and polypropylene), polyesters, polyamides, polycarbonates and the like. Polymeric materials used for the flow deflector can be reinforced, for example by fibrous materials (especially glass fibres or carbon fibres). Materials other than polymeric materials can be used, for example metals.

Preferably the second flow deflector is formed by moulding, for example, by injection moulding.

Preferably, the housing includes a drain outlet for material which has been separated from the gas stream. The outlet will generally provide for removal of material which has collected in a reservoir at the base of the housing. The drain should preferably be capable of opening without depressurising the housing. A suitable drain mechanism is disclosed in EP-A-81826.

This application also describes a separator assembly for removing material that is entrained in a gas stream comprising: a housing having a head part which provides the upper end of the housing and a body part which provides the lower end of the housing, and a shield which extends across the housing towards the lower end thereof so as to leave a collection space between it and the lower end in which material that is separated from the gas stream can collect, with at least one opening in or around the shield through which the material can flow past the shield into the collection space, in which the shield is located within the body part of the housing against forces in a direction towards the lower end of the housing as a result of the action against it by the gas stream through engagement between at least one of (a) the edge of the shield and the internal side wall of the housing, and (b) the shield and the base of the housing.

This assembly has the advantage that, as the shield is mounted on the body rather than the head, it is not necessary to use a tie rod extending from the head to secure the shield in the housing. It has been found that by removing the need for a tie rod in the housing, gas flowing through the housing can be subject to less resistance. Accordingly, this can enable the efficiency of the assembly the invention to be enhanced compared with known assemblies.

It has also been found that this can reduce the likelihood of liquid becoming re-entrained in the gas stream. This is because it has been found that liquid can cling to a tie-rod which can subsequently be caught in the gas stream, thereby becoming re-entrained in it. The absence of the tie rod eliminates this risk.

It is also an advantage that the separator assembly is easier to manufacture and assemble. Also, tie rods are prone to rusting and therefore require replacing regularly. Further, nuts which secure the tie rod to the housing and/or the shield can become loose, which can cause performance and safety problems. Accordingly, separator assemblies using tie rods require regular maintenance and servicing. The described assembly overcomes these disadvantages by removing the need for a tie rod.

The shield can be made from polymeric materials or from metallic materials. It should have sufficient rigidity to ensure that the shield does not flex or move during operation. Suitable materials should not have any adverse reaction with fluids with which the element will come into contact when in use.

The shape of the shield when viewed from above can be, for example, square, rounded, hexagonal. Preferably, the shape of the shield when viewed from above is rotational symmetrical. When the face of the shield that faces toward the upper end of the housing is bowl-shaped, and a helical flow is imparted gas entering the separator assembly, as discussed in more detail below, preferably the shield is approximately rounded, especially approximately circular, when viewed from above. What is meant by approximately circular is that the shield is sufficiently close to circular so that gas can flow over the shield without disturbing the helical nature of the gas flow. This can help to minimise disturbance to the flow of gas due to discontinuities in the path defined by the bowl-shaped shield. Further, it has also been found that a circular shaped shield can provide better acceleration of the helical flow of gas back towards the outlet port over other shaped shields. Both of these factors can result in a smaller pressure drop across the separator assembly. Preferably, the shape of the shield when viewed from above is approximately the same shape as the housing when viewed from above.

The shield can be formed as part of the body part. Preferably, the shield is and the body part are formed as separate parts. This can be advantageous as it can allow the use of different types of shields within a housing. Preferably, the shield is removable from the body part. This can be advantageous as it can allow for the replacement of shields within the housing. Preferably, the shield is held within the body by way of a press-fit in the body. This can allow for easy assembly of the housing.

The term "engagement" in the expression " . . . the shield is located within the body part of the housing . . . through engagement between . . . (a) the edge of the shield and the internal side wall of the housing, and (b) the shield and the base of the housing" does not necessarily mean that the shield is interlocked with the side wall or the base of the housing. Rather, it means that there is a mechanical contact, between the shield and either the side wall or the base of the housing, which holds the shield in a location in the housing against the forces of the gas stream acting in a direction toward the lower end of the housing. The shield can be locked against movement toward the upper end of the housing, but this is not as important as locking the shield against movement toward the lower end of the housing. The mechanical contact can be any form of mechanical contact. Accordingly, the engagement could be provided by a mechanical fastening which interlocks the shield to the housing. The mechanical fastening could be an element in addition to the shield and the housing. For example, the element could be a screw that extends through the shield and into the housing. Optionally, the engagement could be provided by the mere physical contact between the shield and the housing. Further, the engagement could be provided by an adhesive.

It can be preferable that the internal side wall of the housing is roughened. This is because liquid will tend to cling to a smooth surface due to surface tension, and therefore not readily fall down the internal side wall past the shield to the quiet space. This can cause problems with the liquid becoming re-entrained within the case stream. Preferably, the texture of the surface of the internal side wall of the housing between the shield and the upper end of the housing is rough. Roughened surfaces have been found to reduce the liquid to collect due to surface tension effects. Therefore, the liquid tends to fall down the internal side wall's surface more readily, reducing the chance of the liquid becoming re-entrained in the gas stream. The rough texture can be created as a result of moulding with an appropriately roughened surface. When the mould is made from metal, rough surfaces can be made by spark erosion or similar techniques.

A liner sleeve can be provided which covers at least a part of the inside wall of the body part between the shield and the upper end of the body part. The liner sleeve can be provided as a wall of the shield that extends around its perimeter on its face which is directed toward the upper end of the housing. The shield can be located within the body part of the housing against forces in a direction towards the lower end of the housing as a result of the action against it by the gas stream through engagement between the wall of the shield and the internal side wall of the housing. Preferably, the texture of the surface of the inner side wall of the liner sleeve is rough. Preferably, the liner sleeve extends from the shield to a point proximal the upper end of the body part.

The housing should be formed from a material which is capable of withstanding the internal pressures to which it is subjected when in use. Metals will often be preferred, for example aluminium and alloys thereof, and certain steels.

BRIEF DESCRIPTION OF THE DRAWINGS

Embodiments of the invention will now be described, by way of example only, and with reference to the accompanying drawings, in which.

DETAILED DESCRIPTION OF THE PREFERRED EMBODIMENT

Figure 1:
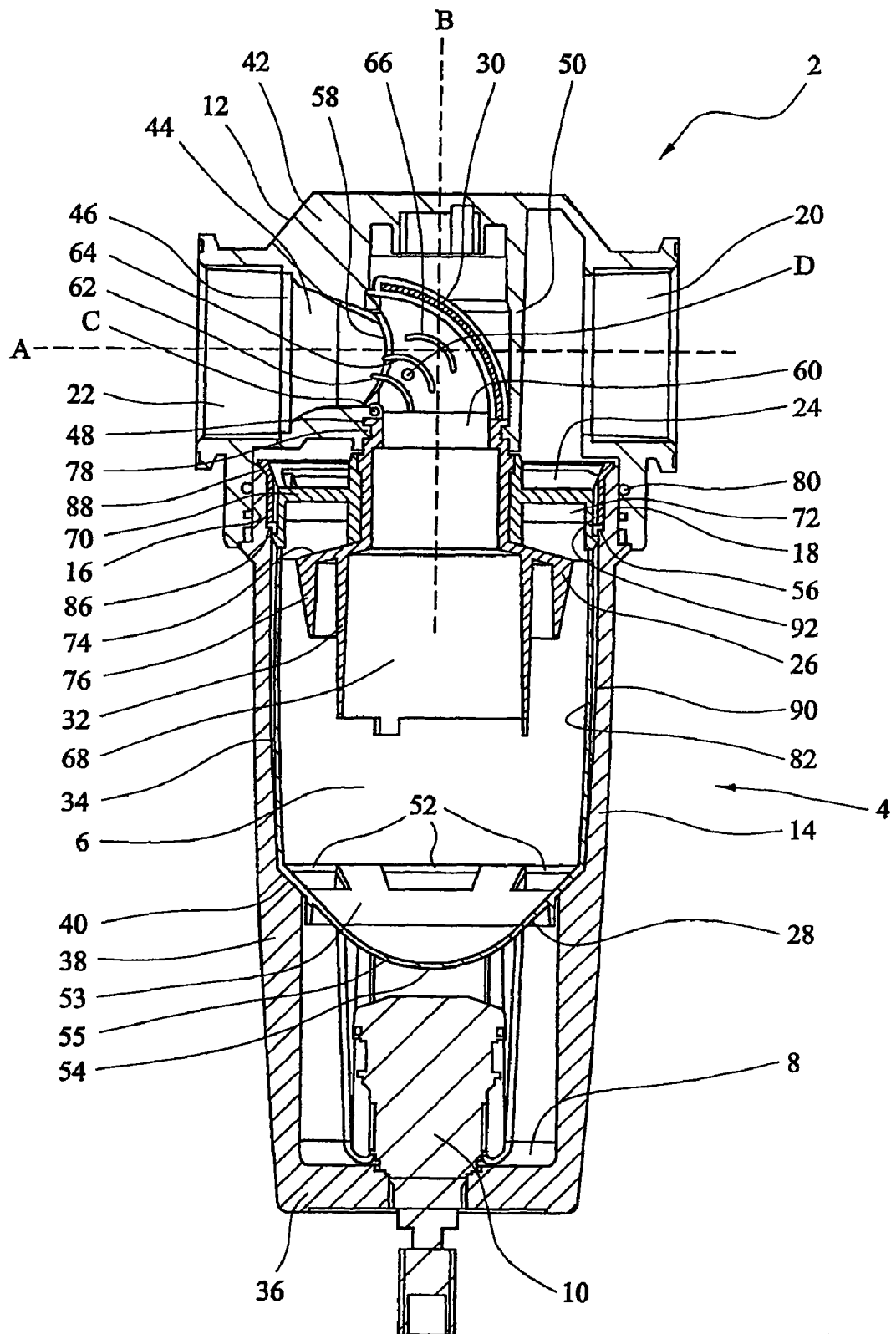
FIG. 1 is a sectional side elevation through a separator assembly according to the present invention.

Referring to the drawings, FIG. 1 shows a separator assembly 2, which comprises a housing 4 defining an inner volume 6. The housing 4 comprises a head part 12, and a body part 14 which can be connected to one another by means of cooperating screw threads at their interfaces 16, 18. The housing 4 further comprises inlet 20 and outlet 22 ports located in the head part 12, for gas to enter and exit the separator assembly 2, a reservoir 8 located at a second end of the housing opposite the first end, and a liquid drainage port 10. The separator assembly further comprises a second flow director 24, a flow deflector 26, a shield 28, a second flow conduit device 30 which includes a conduit portion 32, all located within the body part 14 of the housing 4.

The head part 12 and body part 14 are formed from a metallic material, especially aluminium or an alloy thereof. They can be formed by machining or by techniques such as casting.

The body part 14 comprises a cylindrical wall 34, an end wall 36 at one end of the cylindrical wall 34, and an open end at the opposite end of the cylindrical wall. Liquid separated from a gas stream flowing through the separator assembly is collected in the reservoir 8. The liquid drainage port 10 allows liquid collected in the reservoir 8 to drain from the housing 4. An example of a suitable liquid drainage port 10 is disclosed in EP-A-0081826.

A plurality of fins 38 are provided in the body part 14 towards its second end. The fins 38 extend part way along the cylindrical wall 34 from the second end of the housing toward the first end of the housing, parallel to the axis of the body part. Each fin 38 provides a ledge 40, toward its end proximal the head end of the housing, on which the shield 28 can sit, as described in more detail below.

The head part 12 contains a primary chamber 44 within it having a first end 46 communicating with the outlet port 22 and a second end 48 having an opening communicating with the inner volume 6 of the housing 4 when the separator assembly 2 is assembled. The primary chamber 44 is defined by an internal cylindrical wall 42 extending transversely through within the head part and an internal end wall 50 opposite the outlet port 22.

The shield 28 has a bowl-shaped face 53 and a dome-shaped face 55. The perimeter of the shield 28 is circular in shape. The shield has a plurality of windows 52 cut out of it towards its circumference. The windows 52 allow liquid to pass the shield 28 from the space in the inner volume 6 above the shield to the reservoir 8, as described in more detail below.

Figure 3:
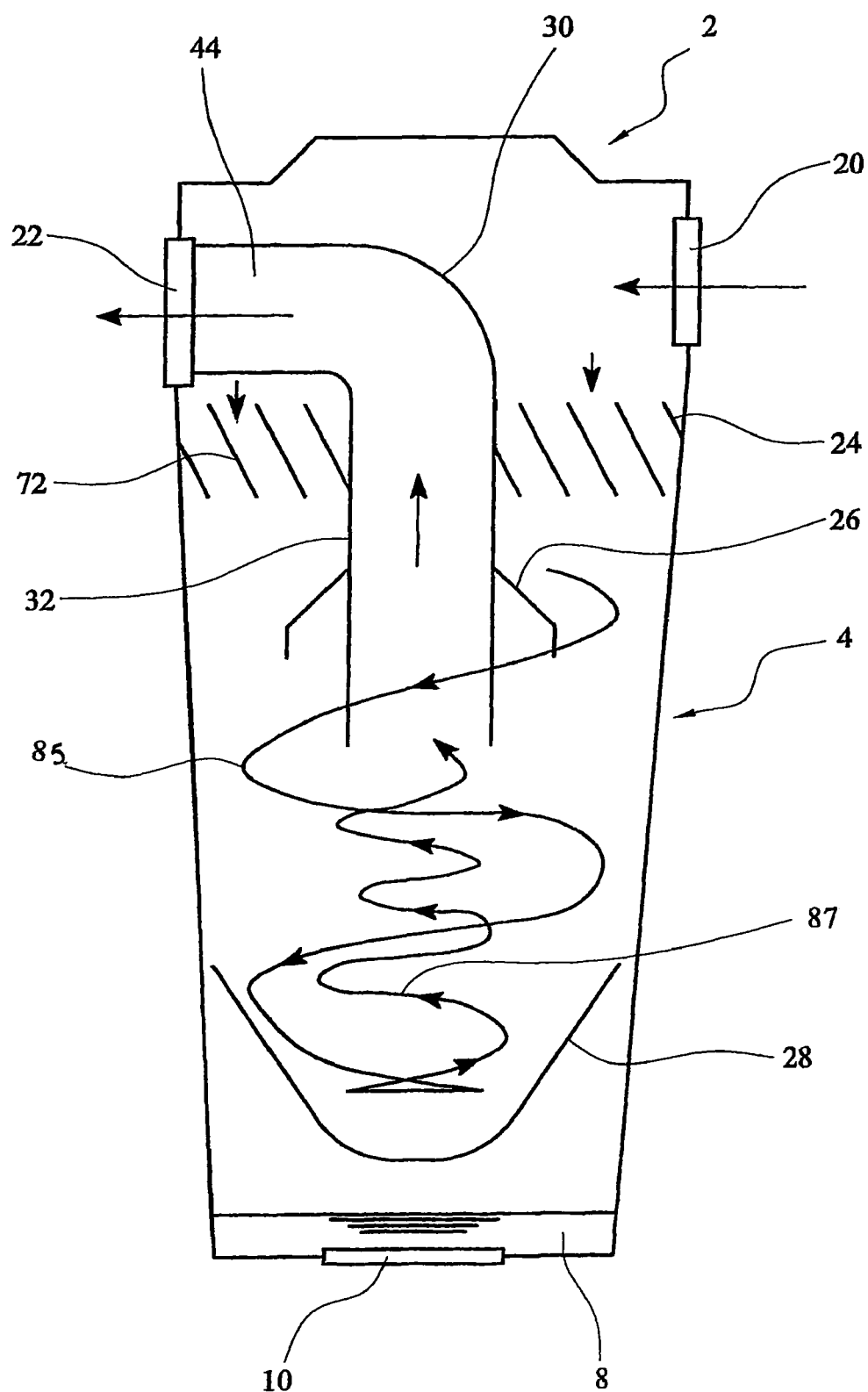
FIG. 3 is a schematic sectional side elevation through the separator assembly shown in FIG. 1, illustrating the flow of gas through the assembly.

The diameter of the shield 28 decreases away from its perimeter towards its centre point 54. The diameter of the shield 28 decreases monotonically for part way towards its centre point, and then progressively decreases for the rest of the way towards its centre point. Therefore, when taken in cross-section as shown in FIGS. 1, 3 and 4, the faces of the shield define a rounded V-shape, having straight edges 96 towards its ends 98 and a rounded bottom towards its centre point 54.

Figure 4:
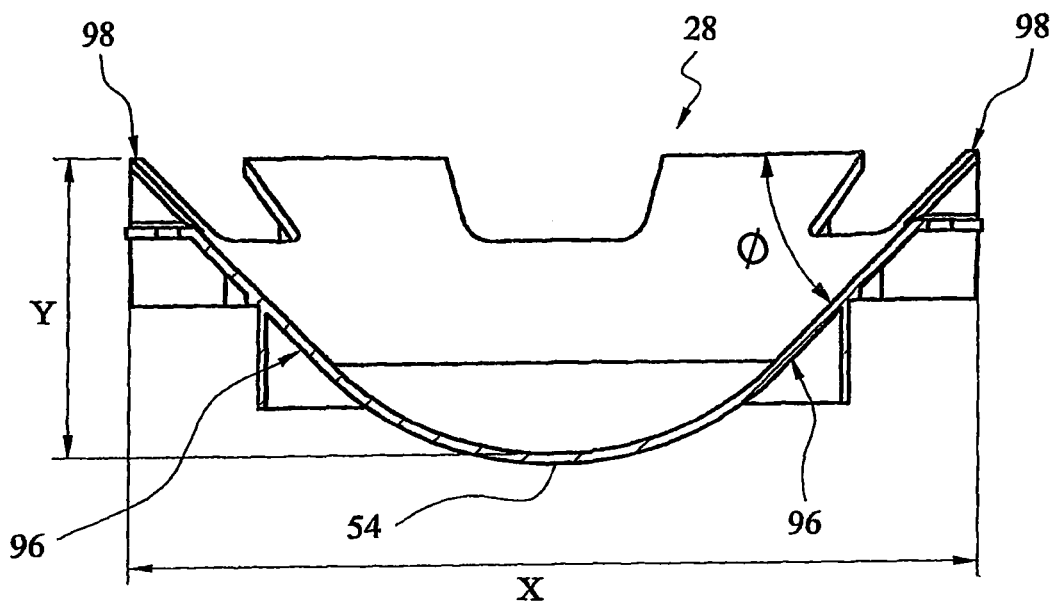
FIG. 4 is a sectional side elevation through the shield of the separator assembly shown in FIG. 1.
Figure 5:
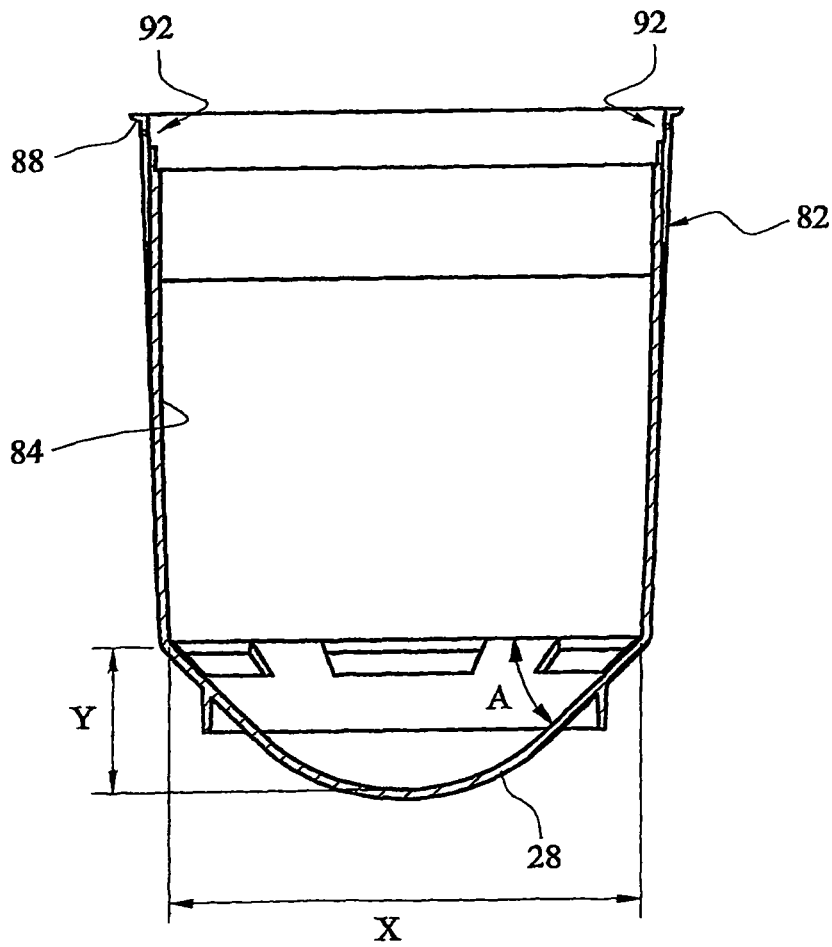
FIG. 5 is a sectional side elevation through the shield and the shield wall of the separator assembly shown in FIG. 1.

As best shown in FIG. 4, the angle Ø between the straight edges 96 of the shield and the plane in which the perimeter of the shield lies, is approximately 45°. Further, the ratio of the diameter X of the shield 28 to the depth Y of the shield 28 is approximately 2.8.

The shield 28 is formed from a polymeric material, such as nylon. It can be formed by techniques such as injection moulding.

A shield wall 82 is provided that extends around the circumference of the shield 28. The shield wall 82 extends from the shield 28 to an open end proximal the open end of the housing body part 14. The shield wall 82 is generally cylindrical in shape, and is a snug fit within the housing body part 14. The surface of the inner side 84 of the shield wall 82 is rough in texture. The open end of the shield wall 82 comprises an annularly extending lip 88. When assembled, the lip 88 rests on the open end of the housing body part 14 as described in more detail below.

Figure 2:
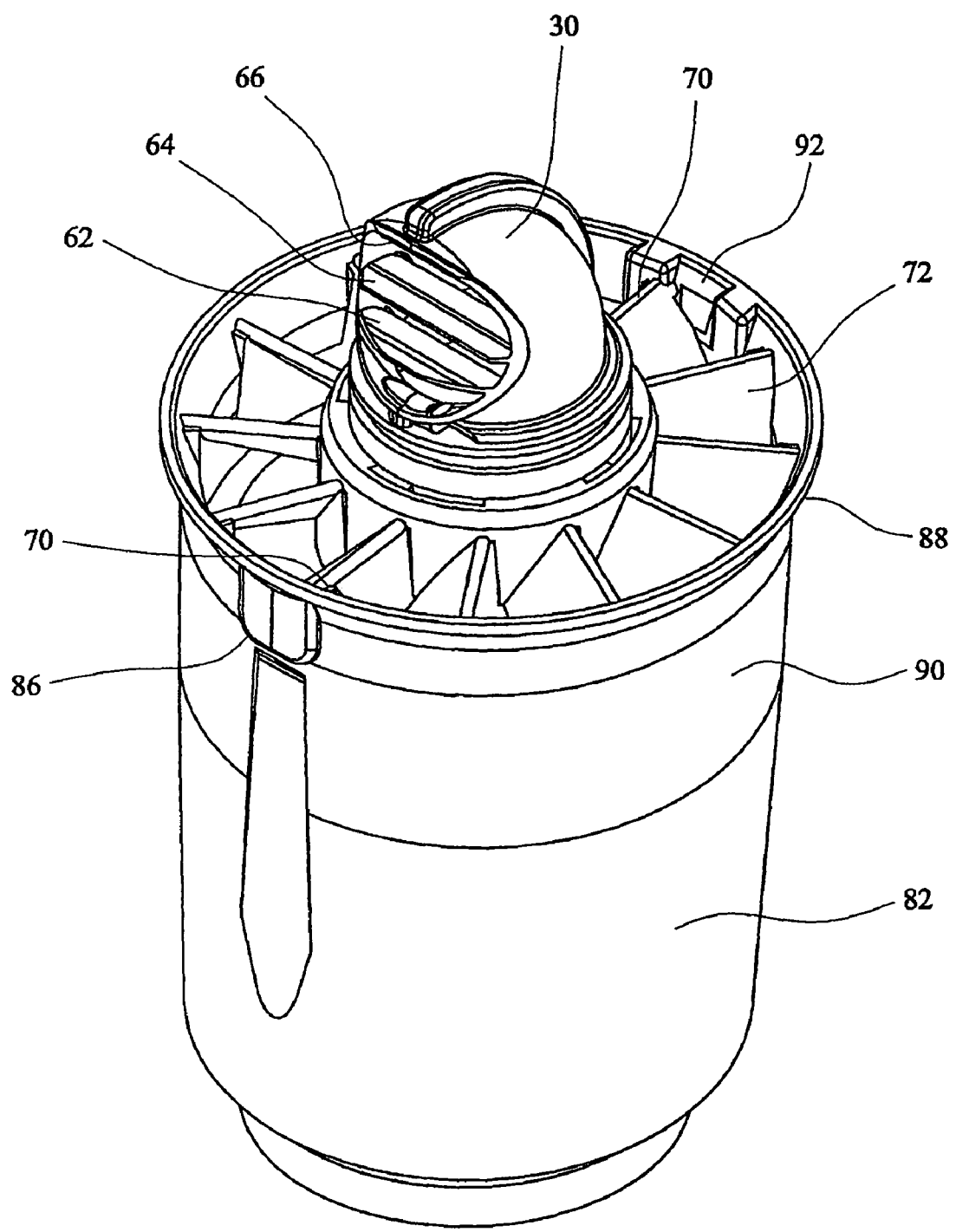
FIG. 2 is perspective view of the separator assembly shown in FIG. 1, without the housing.
Figure 6:
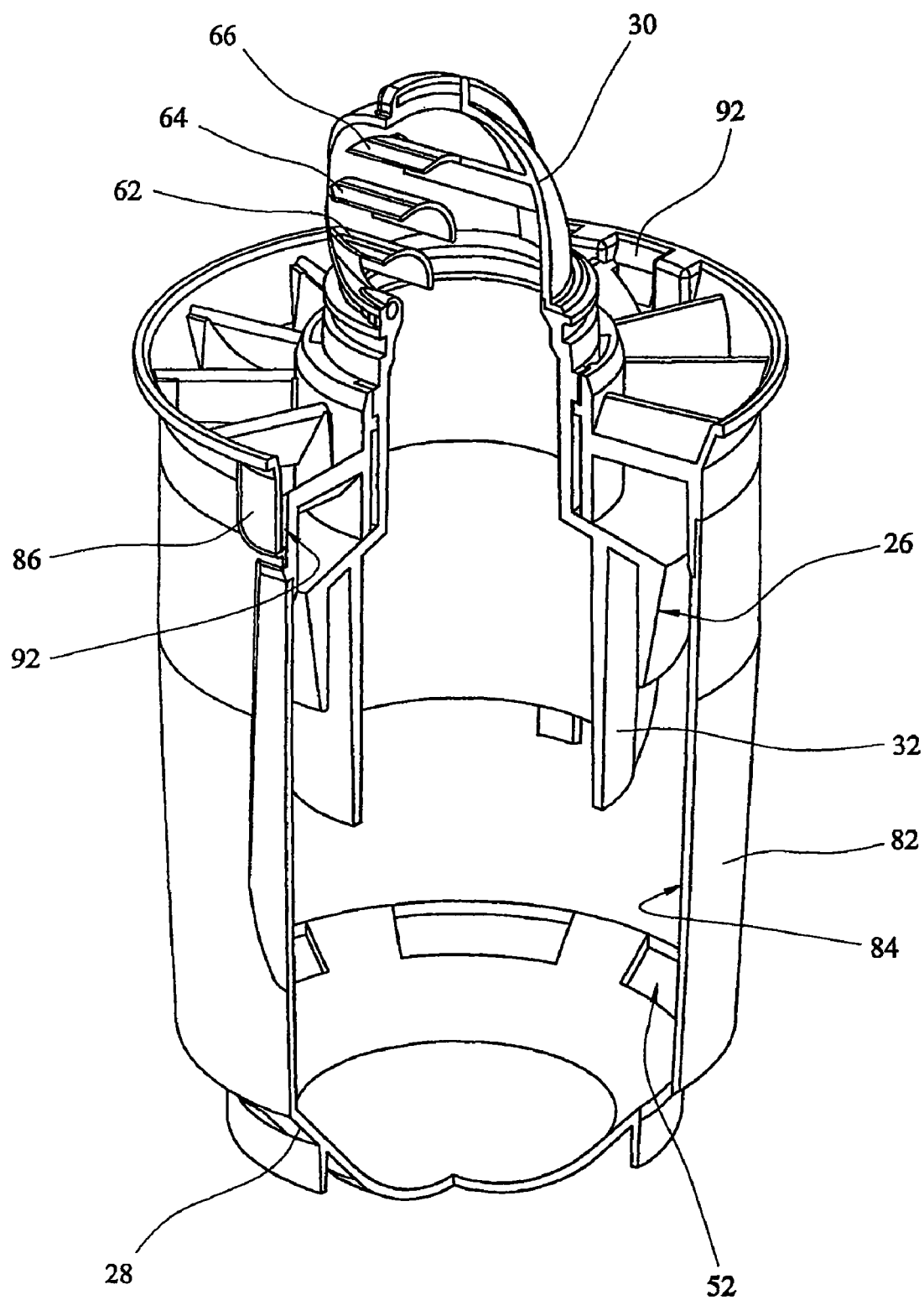
FIG. 6 is a cut-away perspective view of the separator assembly shown in FIG. 1, without the housing.

A plurality of grooves 92 are provided around the inner side 84 of the shield wall 82 at its open end for receiving ribs 70 of the flow conduit device 30 as described in more detail below. In the embodiment shown, two grooves 92 are spaced 180° around the open end of the shield wall 82. As best shown in FIGS. 2 and 6, there are also provided ribs 86 spaced around the outer side 90 of the open end of the shield wall 82. In the embodiment shown, the grooves 92 also act as the ribs 86, and therefore there are provided two ribs 86 that are spaced 180° around the open end of the shield wall 82. When assembled, the ribs 86 are slidingly received within corresponding grooves 56 in the cylindrical wall 34 of the housing body part 14.

In the embodiment shown, the shield wall 82 and the shield 28 are provided as a single piece. However, as discussed above the shield wall 82 and the shield 28 can be provided as separate pieces. Accordingly, it will be understood that in such an embodiment both the shield 28 and the shield wall 82 will have formations which enable them to be located in the housing body part 14.

The flow conduit device 30 has a first opening 58 that is directed towards the outlet port 22 and has a first axis A, and a second opening 60 that is directed toward the body part 14 of the housing and has a second axis B. The angle between the axes A, B of the first 58 and second 60 openings is 90°. The flow conduit device 30 provides a continuous flow path between the two openings, and therefore provides a smooth change of direction for gas flowing through it when in use. The flow conduit device 30 turns about an axis C which extends perpendicularly to the axes A, B of the first 58 and second 60 openings. (As shown in FIG. 1, the axis C extends perpendicularly to the plane along which the cross-section of the separator assembly 2 is taken).

An O-ring 78 is provided around the flow conduit device 30, within an annular recess that extends around the external surface of the flow conduit device at its second opening 60 end.

The flow conduit device 30 contains first 62, second 64 and third 66 curved vanes extending perpendicularly across the flow conduit device 34. Each vane 62, 64, 66 curves around its own axis and the radius of curvature is the same for each vane. Further, the length of the vanes 62, 64, 66, measured between their leading and trailing edges, is the same for each vane. The axes around which the vanes 62, 64, 66 curve extend parallel to the axis C around which the flow conduit device 30 curves. For example, the second vane 64 curves around an axis D. The vanes 62, 64, 66 each have concave and convex surfaces, wherein the concave surface of each vane faces the first 58 and second 60 openings of the flow conduit device 30. Accordingly, the vanes 62, 64, 66 help guide the flow of gas between the first 58 and second 60 openings.

The flow conduit device 30 further includes a conduit portion 32 which, when the separator assembly 2 is assembled, extends into the housing body part 14. In this embodiment, the flow conduit device 30 and the conduit portion 32 are one piece. However, it will be appreciated that they need not be one piece. The conduit portion 32 defines a flow path 68 for gas leaving the inner volume 6 and is in fluid communication with the second opening 60 of the flow conduit device 30. The walls of the conduit portion 32 are cylindrical. The diameter of the conduit portion 32 is narrower towards its end proximal the second opening 60.

The first flow director 24 comprises plurality of baffles 72 provided around the conduit portion 32. When the flow conduit device 30 is located within the housing body part 14, the baffles 72 extend between the conduit portion 32 and the inner side of the cylindrical wall 34 of the body part. The baffles are rectangular in shape and are arranged so that their planar faces extend at an angle to the longitudinal axis of the housing body part 14 when the flow conduit device 30 is located in the body part 14.

The flow conduit device 30 further comprises a plurality of ribs 70 that extend away from the conduit portion 32 at its end proximal the second opening 60. The ribs 70 can slide into the grooves 92 in the shield wall 28 in order to hold the flow conduit device 30 within body part 14. In the embodiment shown two ribs 70 are provided spaced 180° around the conduit portion 32. Also in the embodiment shown, each of the ribs 70 is also a baffle 72. However, it will be appreciated that the ribs 70 can have a different configuration to the baffles 72 and therefore not be baffles.

The second flow deflector 26 extends annularly around the conduit portion 32, and is shaped and sized so that it extends away from the conduit portion part way toward the inner side of the shield wall 82, when the flow conduit device 30 is located in the body part. The flow deflector 26 is located on the side of the baffles 72 distal to the second end 62 of the flow conduit device 30. The flow deflector 26 comprises a ledge portion 74 proximal the baffles 72 which extends away from the conduit portion 32, substantially perpendicularly to the axis of the conduit portion 32, and an side skirt 76 which extends away from the end of the ledge portion, substantially parallel to the axis of the conduit portion.

The flow conduit device 30 is formed from a polymeric material, for example nylon. The flow conduit device 30 can be formed by techniques such as injection moulding. The different parts of the flow conduit device 30, such as the conduit portion 32, the ribs 70, the first flow director 24 and the second flow deflector 26 can be formed together as one piece, as different pieces, or as a combination of single and different pieces (i.e. the conduit portion 32 and the flow deflector 26 can be formed as one piece and the flow director 24 as a separate piece subsequently fastened to the conduit portion).

The separator assembly 2 is assembled by locating the shield 28 and shield wall 82 in the housing body part 14 by sliding them through the body part until the portions between the windows 52 of the dome-shaped face 55 of the shield 28 rest on the ledges 40 of the fins 38, and until the ribs 86 are received within the grooves 56 in the cylindrical side wall 34 of the housing body part 14. Once the ribs 86 have been fully received by the grooves 56, the shield 28 and shield wall 82 are securely suspended within the housing body part 14, and the lip 88 should rest on the open end of the housing body part 14. The shield 28 and shield wall 82 are then securely suspended within the housing body part 14, and rotation of the shield 28 and shield wall 82 within the housing body part 14 is restricted by the interlocking of the ribs 86 with the grooves 56.

The flow conduit device 30 is then located in the housing body part 14 by sliding the ribs 70 into the grooves 92 until they sit on the bottom of the grooves. Once the ribs 70 have been fully received by the grooves 92, the flow conduit device 30 is securely suspended within the housing body part 14. Therefore, the axial position of the flow conduit device 30 within the housing body part 14 can be controlled by the shape and size of the ribs 70 and the grooves 92. Further, rotation of the flow conduit device 30 is restricted by the interlocking of the ribs 70 with the grooves 92. The flow conduit device 30 can be removed from the housing body part 14 by pulling the flow conduit device away from the body part along its axis.

The housing head part 12 is secured to the housing body part 14 by locating the flow conduit device 30 in the primary chamber 44 of the head part through the opening at the primary chamber's second end 48. The O-ring 78 is received by the opening, and is compressed by the walls of the primary chamber 44 to form a fluid tight seal.

The housing head part 12 and body part 14 are secured by rotating one relative to the other so that their cooperating screw threads at their interfaces 16, 18 are tightened to interlock with each other. An O-ring 80 is provided at the interfaces 16, 18 which is compressed by the interfaces to form a fluid tight seal. When assembled, the inlet port 20 is in fluid communication with an inner volume 6 of the housing 4.

The separator assembly 2 can be disassembled by rotating the bousing head part 12 and body part 14 relative to each other so that their cooperating screw threads are loosened. Any rotational force that is imparted on the flow conduit device 30 by frictional and related forces (for example arising from physical or chemical interactions or both) between the O-ring 78 on the flow conduit device and the primary chamber 44 of the head part 12 is negated by the opposite rotational drive that is provided by the ribs 70 acting against the grooves 92 in the shield wall 28. Therefore, as the housing head part 12 and body part 14 are rotated relative to each other, the flow conduit device 30 will tend to reside in the body part rather than be drawn away from the body part with the head part. Accordingly, when the head part 12 and the body part 14 are separated from each other, the flow conduit device 30 will remain located within the body part 14.

Figure 7:
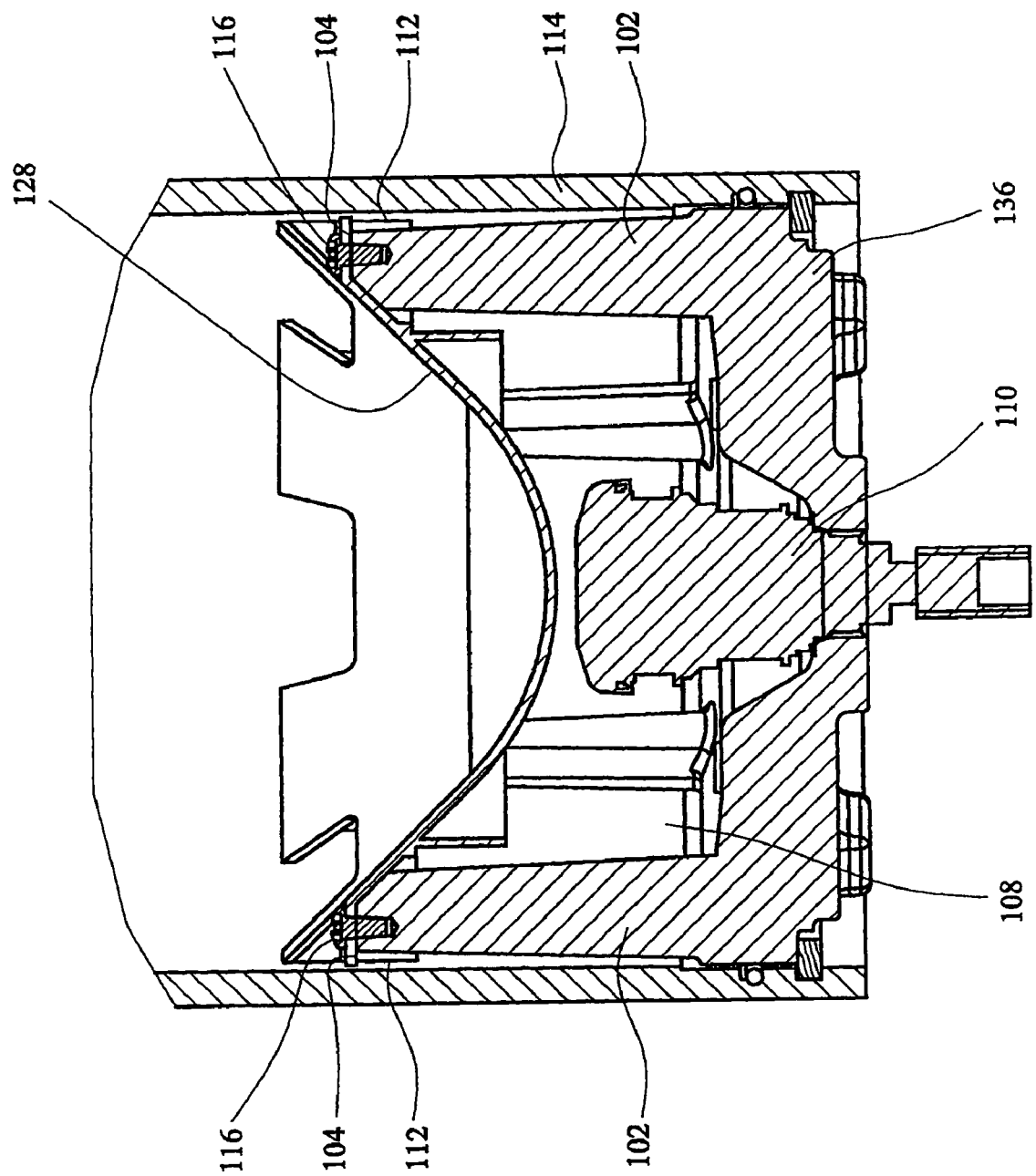
FIG. 7, is a sectional side elevation through the lower end of the body part of a separator assembly according to the present invention.
Figure 8:
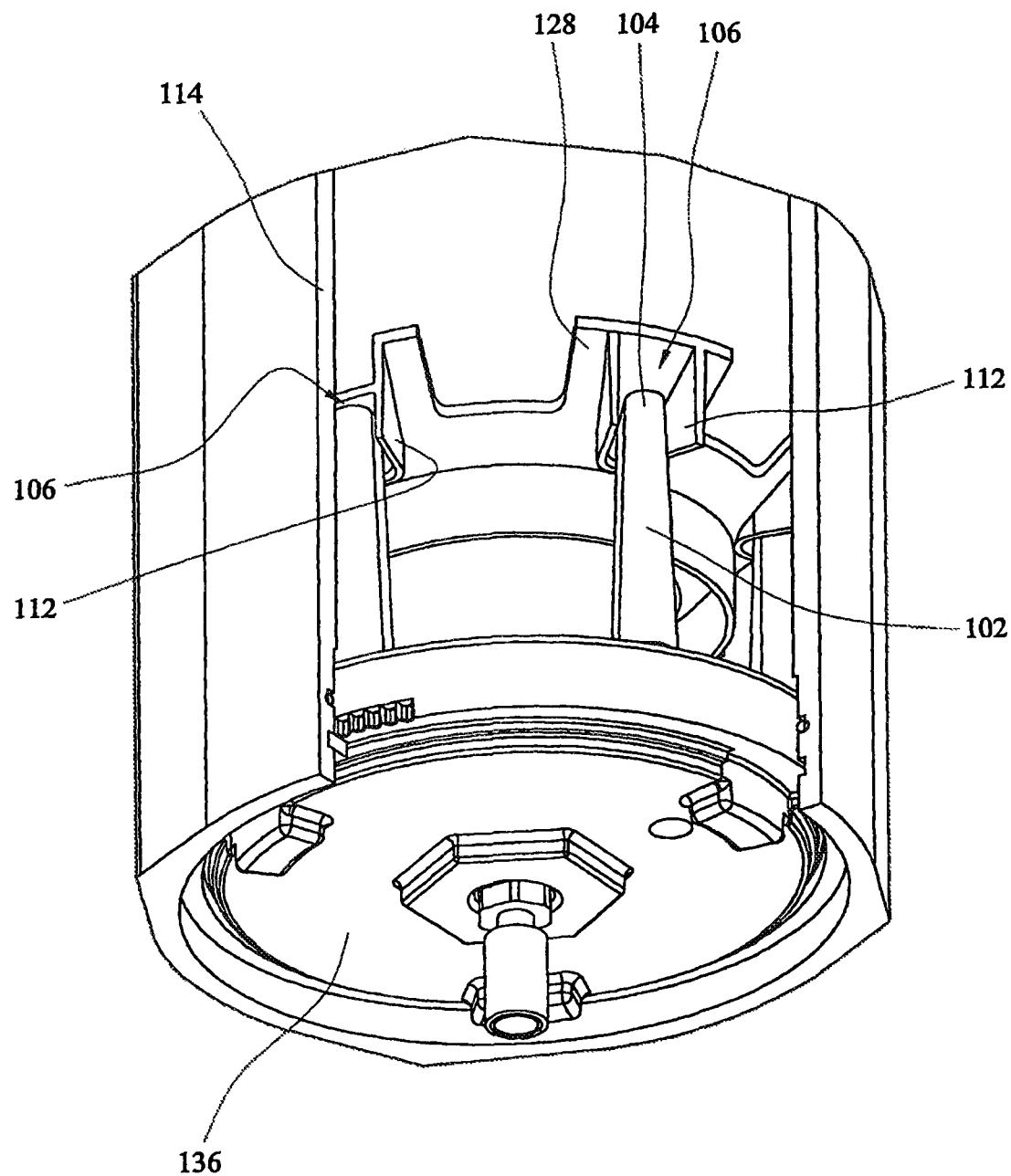
FIG. 8, is a cut-away perspective view of the separator assembly shown in FIG. 7.

Referring to FIGS. 7 and 8, a section of an alternative embodiment of the separator assembly is shown. In this embodiment housing body part 114 is formed by an extrusion process rather than casting a casting process and the end wall of the body part is provided by a closure plate 136. A drainage port 110 is provided that allows liquid collected in the reservoir 108 to drain from the housing. A plurality of upstand supports 102 are provided that extend between the closure plate 136 and the face of the shield 128 that faces toward the lower end of the housing. The upstand supports 102 are located so that their top surfaces 104 are spaced around the face of the shield 128 that faces toward the closure plate of the housing, towards the perimeter of that face.

The shield 128 provides a plurality of sockets 106 on its face that faces towards the lower end of the housing, in which the upstand supports 102 can be received. The walls 112 of the sockets 106 are shaped and sized so that the upstand supports 102 are a tight fit in the socket. The shield 128 is anchored to the upstand supports 102 by screws 116 that extend through the shield 128 into the upstand supports 102.

In use, the separator assembly is used in a substantially vertical position, with the housing head part 12 being above the body part 14. A gas having an entrained material that is to be removed from the gas enters the separator assembly through the inlet port 20. In the embodiment described, the gas is air and the material is water. The air flows away from the inlet port 20, and passes over the baffles 72 of the flow director 24. The configuration and arrangement of the baffles 72 impart a helical flow to the gas stream as illustrated by line 85. Once the gas has passed through the first flow director 24, over the baffles 72, the gas then flows over the flow deflector 26. The configuration and arrangement of the flow deflector 26 forces the gas to flow outwards towards the shield wall 28.

Due to the water entrained in the gas being heavier than the gas, the water is pushed outward towards the shield wall 82 as the gas stream spins in a helical manner. This is due to the centrifugal force on the water as the gas/water mixture turns. The water then falls down the inner side 84 of the shield wall 82, passes past the shield 28 through the windows 52, and collects in the reservoir 8 at the bottom of the housing body part 14. The water can be drained from the reservoir 8 by operating the liquid drainage port 10.

The gas continues to travel away from the inlet port 20 in a helical motion, until it reaches the shield 28. At this point, the gas is reflected off the shield 30 back toward the housing head part 12, as illustrated by line 87. Due to the bowl-shape of the shield 30, the helical flow of the gas stream is maintained. Further, the shield acts to accelerate the helical flow of gas toward the conduit portion 32 of the flow conduit device 30.

The shield 28 acts as a barrier to the gas flowing past it. The turbulence in the volume of gas in the area below the shield 28, i.e. between it and the housing body part's 14 end wall 36, is less than the turbulence in the volume of gas above the shield. Accordingly, the space between the shield 28 and the housing body part's 14 end wall 36 is known as a "quiet space".

The gas stream then passes through the conduit portion 32, the flow conduit device 30, and finally through the primary chamber 44 before being discharged from the separator assembly 2 by the outlet port 22. The smooth change of direction provided by the flow conduit device 30, and also the vanes 62, 64, 66, help to turn the gas as it passes through the flow conduit device. This helps to reduce turbulence in the flow conduit device 30 and thereby helps to reduce the drop in pressure across the flow conduit device caused by the change of direction.

What is claimed is:

1. A separator assembly for removing material that is entrained in a gas stream comprising:
   a. a housing having a head part which provides the upper end of the housing and a body part which provides the lower end of the housing; and
   b. a shield which extends across the housing towards the lower end thereof so as to leave a collection space between it and the lower end in which material that is separated from the gas stream can collect, with at least one opening in or around the shield through which the material can flow past the shield into the collection space,
   c. a liner sleeve which covers at least a part of the inside wall of the body part between the shield and the upper end of the body part, the liner sleeve having an inner side wall with an imperforate surface, in which the surface of the inner side wall of the liner sleeve has formations which reduce the tendency of liquid to cling to the surface of the inner side wall of the liner sleeve, the formations including one of: i) a rough texture, ii) grooves, and iii) a helically extending rifle surface.

2. A separator assembly as claimed in claim 1, in which the liner sleeve extends completely annularly around the inside wall of the body part.

3. A separator assembly as claimed in claim 1, in which the liner sleeve extends from the face of the shield which is directed toward the upper end of the housing to the upper end of the body part.

4. A separator assembly for removing material that is entrained in a gas stream comprising:
   a. a housing having a head part which provides the upper end of the housing and a body part which provides the lower end of the housing; and
   b. a shield which extends across the housing towards the lower end thereof so as to leave a collection space between it and the lower end in which material that is separated from the gas stream can collect, with at least one opening in or around the shield through which the material can flow past the shield into the collection space,
   c. a liner sleeve which covers at least a part of the inside wall of the body part between the shield and the upper end of the body part, in which the surface of the inner side wall of the liner sleeve has formations which reduce the tendency of liquid to cling to the surface of the inner side wall of the liner sleeve, and in which the liner sleeve is provided as part of the shield as a wall that extends around the perimeter of the shield on the face of the shield which is directed toward the upper end of the housing, so that the shield and the liner sleeve can be removed from the housing as one piece.

5. A separator assembly for removing material that is entrained in a fluid stream comprising:
   a. a housing having a head part which provides the upper end of the housing and a body part which provides the lower end of the housing; and
   b. a shield which extends across the housing towards the lower end thereof so as to leave a collection space between it and the lower end in which material that is separated from the fluid stream can collect, with at least one opening in or around the shield through which the material can flow past the shield into the collection space,
   c. a liner sleeve which covers at least a part of the inside wall of the body part between the shield and the upper end of the body part in which the surface of the inner side wall of the liner sleeve has formations which reduce the tendency of liquid to cling to the surface of the inner side wall of the liner sleeve, the formation including at least one of: i) a rough surface; ii) grooves, and iii) a helically extending rifle surface.

6. A separator assembly for removing material that is entrained in a fluid stream comprising:
   a. a housing having a head part which provides the upper end of the housing and a body part which provides the lower end of the housing; and
   b. a shield which extends across the housing towards the lower end thereof so as to leave a collection space between it and the lower end in which material that is separated from the fluid stream can collect, with at least one opening in or around the shield through which the material can flow past the shield into the collection space,
   c. a liner sleeve which covers at least a part of the inside wall of the body part between the shield and the upper end of the body part in which the surface of the inner side wall of the liner sleeve has formations which reduce the tendency of liquid to cling to the surface of the inner side wall of the liner sleeve, and in which the liner sleeve is provided as part of the shield as a wall that extends around the perimeter of the shield on the face of the shield which is directed toward the upper end of the housing, so that the shield and the liner sleeve can be removed from the housing as one piece.

* * * * *